(12) United States Patent
Van Vuure et al.

(10) Patent No.: US 11,141,935 B2
(45) Date of Patent: Oct. 12, 2021

(54) CONTINUOUS FIBROUS TAPE COMPRISING FIBRES AND METHOD FOR MAKING SUCH TAPE

(71) Applicant: Katholieke Universiteit Leuven, Leuven (BE)

(72) Inventors: Aart Willem Van Vuure, Maastricht (NL); Efrain Eduardo Trujillo De Los Rios, Manizales (CO); Lina Rocio Osorio Serna, Manizales (CO)

(73) Assignee: Katholieke Universiteit Leuven, Leuven (BE)

( * ) Notice: Subject to any disclaimer, the term of this patent is extended or adjusted under 35 U.S.C. 154(b) by 22 days.

(21) Appl. No.: 16/479,228

(22) PCT Filed: Jan. 18, 2018

(86) PCT No.: PCT/EP2018/051246
§ 371 (c)(1),
(2) Date: Jul. 19, 2019

(87) PCT Pub. No.: WO2018/134324
PCT Pub. Date: Jul. 26, 2018

(65) Prior Publication Data
US 2019/0375168 A1 Dec. 12, 2019

(30) Foreign Application Priority Data
Jan. 19, 2017 (GB) .................................... 1700913

(51) Int. Cl.
*B29C 70/20* (2006.01)
*B29C 70/38* (2006.01)
(Continued)

(52) U.S. Cl.
CPC ............. *B29C 70/20* (2013.01); *B29C 70/386* (2013.01); *B29C 70/50* (2013.01); *D04H 1/74* (2013.01); *D04H 3/015* (2013.01); *D04H 3/04* (2013.01)

(58) Field of Classification Search
CPC ....... B29C 70/20; B29C 70/386; B29C 70/50; D04H 1/74; D04H 3/015; D04H 3/04;
(Continued)

(56) References Cited

U.S. PATENT DOCUMENTS

2017/0183465 A1* 6/2017 Kawabe ................... C08J 5/042

FOREIGN PATENT DOCUMENTS

CN 103571038 A1 2/2014
DE 102005060500 A1 6/2007
(Continued)

*Primary Examiner* — Nathan L Van Sell
(74) *Attorney, Agent, or Firm* — N.V. Nederlandsch Octrooibureau; Catherine A. Shultz; Tamara C. Stegmann

(57) ABSTRACT

The invention relates to a continuous fibrous tape comprising a substantially planar sheet of natural fibres of length Li. The sheet has a longitudinal dimension L and a transverse dimension w. The sheet comprises planar units positioned in n longitudinal lines. The planar units of adjoining longitudinal lines are misaligned by a misalignment distance Lv, with Lv being at least 3 w/n.

Furthermore if the misalignment distance Lv between planar units of a first longitudinal line and the planar units of a second longitudinal line is less than 3 w/n, then there are at least two longitudinal lines positioned between the first longitudinal line and the second longitudinal line.

The invention further relates to a method of manufacturing such a continuous fibrous tape and to the use of such a continuous fibrous tape to manufacture a composite article.

18 Claims, 8 Drawing Sheets

(51) Int. Cl.
*B29C 70/50* (2006.01)
*D04H 1/74* (2006.01)
*D04H 3/015* (2012.01)
*D04H 3/04* (2012.01)

(58) Field of Classification Search
CPC ... B29K 2311/10; C08J 2363/00; C08J 5/045; C08J 5/24
See application file for complete search history.

(56) References Cited

FOREIGN PATENT DOCUMENTS

| | | | |
|---|---|---|---|
| JP | 2011011545 | A1 | 1/2011 |
| WO | WO98/10906 | A1 | 3/1998 |
| WO | WO2015192867 | A1 | 12/2015 |

\* cited by examiner

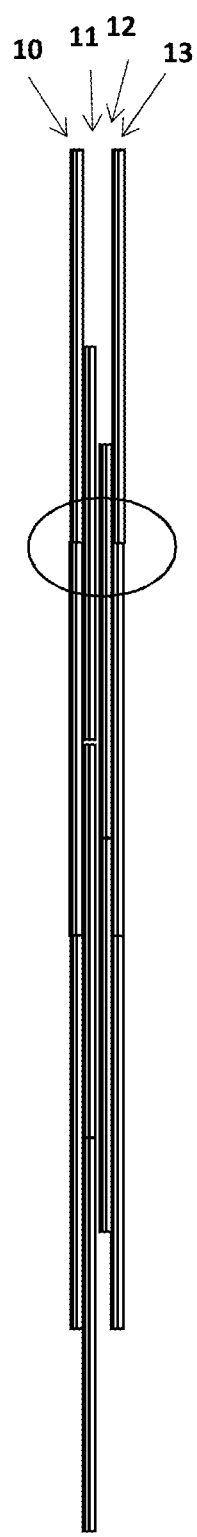
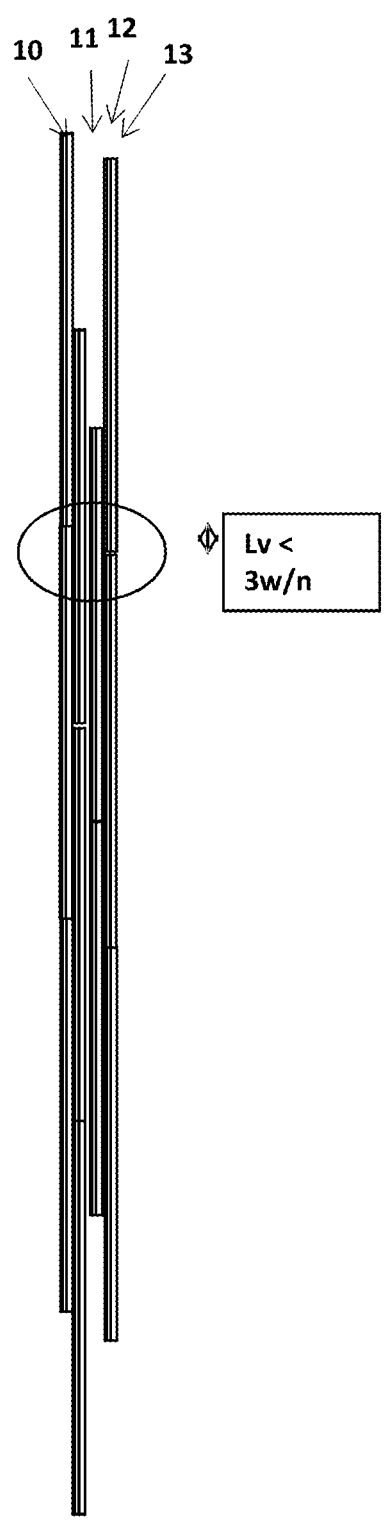
FIGURE 9(a)  FIGURE 9(b)

CONTINUOUS FIBROUS TAPE COMPRISING FIBRES AND METHOD FOR MAKING SUCH TAPE

FIELD OF THE INVENTION

The present invention relates to a continuous fibrous tape comprising fibres and is particularly relevant for natural fibres. The invention further relates to a method for manufacturing such a continuous fibrous tape. Furthermore the invention relates to the use of a continuous fibrous tape to manufacture composite articles.

BACKGROUND OF THE INVENTION

A composite is commonly defined as a combination of two or more distinct materials, each of which retains its own distinctive properties, to create a new material with properties that cannot be achieved by any of the components acting alone. Composites consist of a combination of two or more phases such as a reinforcing phase and a matrix phase. The reinforcing phase (e.g. fibres) provides strength and stiffness and is embedded in the matrix phase. The matrix phase acts as a binder for the reinforcement while controlling the physical shape and dimensions of the part. The synergy of the different materials allows composites to have a strength-to-weight ratio and a stiffness-to-weight ratio several times greater than steel or aluminum. Applications that require a low weight and high stiffness will benefit greatly by using composites instead of more traditional materials. These applications range from commercial aircraft to sports equipment.

Traditionally, synthetic fibres like glass fibres or carbon fibres are used as reinforcement in composites. However, the production of these synthetic fibres demands large amounts of energy and therefore high production costs. Natural fibres prove to be low cost materials and a greener alternative. For example bamboo fibres have specific properties similar to glass fibres which are the main synthetic fibres used nowadays in industry. A high growth rate combined with a good availability makes bamboo a great sustainable natural resource. However due to the structural morphology of the bamboo fibre plant, the fibre length is limited, impeding the production of endless bamboo yarn.

Therefore, there is a need for a tape comprising fibres such as natural fibres as for example bamboo fibres having a limited length and for a method for manufacturing such a tape.

SUMMARY OF THE INVENTION

It is an object of the present invention to provide a continuous fibrous tape of natural fibres that can be manufactured in an efficient and cost-effective way.

It is another object of the present invention to provide a continuous fibrous tape of fibres, in particular of natural fibres, having a high longitudinal tensile strength, once consolidated into a composite material, while having a limited thickness.

It is a further object of the present invention to provide a continuous fibrous tape having a longitudinal tensile strength that is at least 80% of the longitudinal tensile strength of unidirectional (UD) continuous fibres composites known in the art.

It is still a further object of the present invention to provide a continuous fibrous tape that may be used as a preform or prepreg in the composite industry, for example as reinforcement in high performance composites.

In addition, it is an object of the present invention to provide a continuous tape and prepreg providing an alternative to glass and carbon fibre tapes and prepregs, having a lower environmental impact.

These objects are met by the tape arrangement, the method and the use according to the independent claims of the present invention. The dependent claims relate to preferred embodiments.

In a first aspect the present invention provides a continuous fibrous tape comprising a substantially planar sheet of fibres of length Li. The substantially planar sheet has a longitudinal dimension L and a transverse dimension w. The substantially planar sheet comprises substantially planar units positioned in n longitudinal lines, with the n longitudinal lines positioned next to each other, i.e. positioned transversally next to each other. Each planar unit comprises individual fibres having substantially the same length Li. Each planar unit has four peripheral edges, i.e. a first and a second transverse peripheral edge, opposite to each other, and a first and a second longitudinal peripheral edge, opposite to each other. The first and the second transverse peripheral edge have a dimension w/n and the first and the second longitudinal peripheral edge have a dimension Li. Each longitudinal line comprises a plurality of planar units positioned in such a way that the first transverse peripheral edge of a first planar unit is adjoining the second transverse peripheral edge of a second planar unit adjoining said first planar unit. For the purpose of this invention the term 'adjoining' should be understood as lying next to or being in contact with within a manufacturing tolerance of less than 2 mm distance. The planar units of a longitudinal line are misaligned with planar units of another longitudinal line in a particular way. Preferably, the transverse peripheral edges of planar units in a longitudinal line are misaligned in longitudinal direction with the transverse peripheral edges of planar units in an adjoining longitudinal line by a misalignment distance Lv, wherein the misalignment distance Lv is at least 3 w/n. More preferably, the misalignment distance is at least 4 w/n or at least 5 w/n. Furthermore, if the misalignment distance Lv between the transverse peripheral edge of planar units in a first longitudinal line and the transverse peripheral edges of planar units in a second longitudinal line is less than 3 w/n, then there are at least two longitudinal lines positioned between the first longitudinal line and the second longitudinal line. If the misalignment distance Lv between the transverse peripheral edge of planar units in a first longitudinal line and the transverse peripheral edges of planar units in a second longitudinal line is less than 3 w/n, then there are for example three, four, five or even more longitudinal lines positioned between the first longitudinal line and the second longitudinal line.

The fibres of the tape according to the present invention comprise preferably natural fibres. For the purpose of this invention natural fibres are defined as fibres extracted from natural or agricultural sources which are usually plants or trees, although fibres of animal origin can also be considered.

Preferred examples of natural fibres comprise bamboo fibres. However other fibres such as flax fibres, hemp fibres, coir fibres, jute fibres, kenaf fibres or any fibres of natural or agricultural origin can be considered as well. Technical bamboo fibres typically have a length between 20 and 30 cm.

The fibres of the tape according to the present invention may also comprise synthetic fibres, instead of or in addition to the natural fibres. The synthetic fibres can for example be mixed with the natural fibres.

Synthetic fibres comprise for example polymer fibres, ceramic fibres, metal fibres, carbon fibres, glass fibres and/or combinations thereof. Examples of polymer fibres comprise aramid fibres, polyethylene fibres, polyester fibres and/or combinations thereof.

A clear distinction of natural fibres compared to synthetic fibres is that they are always discontinuous in nature generally with lengths of maximum a few meters, but often less than 0.5 m.

Another clear distinction of natural fibres compared to synthetic fibres is that they often have larger fibre diameters. Technical bamboo fibres e.g. often have diameters of more than 100 µm, which means that their so-called aspect ratio, the length over diameter ratio, is limited. High fibre diameter also leads to high fibre bending stiffness, which together with the limited aspect ratio, means that natural fibres as for example technical bamboo fibres cannot easily or practically or not at all be processed by conventional continuous yarn production processes like fibre spinning. This indicates the importance to produce a continuous tape from these discontinuous fibres. Other natural fibres, like flax fibres, are thinner (diameter order 50 µm) and longer (length order 70 cm) and can be spun into continuous yarn. Spinning however puts twist on the fibres, which lowers the properties of natural fibre composites, once the fibres have been impregnated with resin and the properties of the consolidated composite are determined. Therefore, the tape according to this invention may also have relevance for flax fibre. Synthetic fibres normally get produced in endless lengths and in this case there is little or no benefit of the tape concept according to this invention. However, when synthetic fibres are recycled, like in the case of carbon fibres (generally having a diameter 5 to 10 µm), the fibres usually become discontinuous with lengths of typically a few cm. In this case, the tape concept according to this invention becomes also relevant for recycled synthetic fibre, in particular in case the goal is to make a continuous reinforcement on the basis of the discontinuous fibres, with properties close to the original continuous fibre.

Therefore, this invention is relevant for a multitude of fibres, preferably with a diameter ranging between 5 µm and 4 mm. In case of natural fibres, the diameter will typically range between 30 µm up to a few mm. For technical bamboo fibre the typical range is between 100 and 500 µm, as for example ranging between 100 and 300 µm or between 150 and 250 µm. For the purpose of this invention, the term "diameter" corresponds with the "equivalent diameter" in case the fibres do not have a circular cross-section. All fibres of a planar unit can have the same or substantially the same diameter. Alternatively, a planar unit may comprise fibres with different diameters.

The natural fibres such as the bamboo fibres preferably have a length Li of at least 5 cm. More preferably, the natural fibres such as the bamboo fibres have a length Li ranging between 5 cm and 50 cm, as for example ranging between 10 cm and 30 cm or between 10 cm and 20 cm.

In preferred embodiments all fibres of the continuous fibrous tape comprise natural fibres as for example bamboo fibres.

In preferred embodiments, the planar units positioned in one longitudinal line have the same or substantially the same length.

In particular embodiments, the planar units of different longitudinal lines have the same or substantially the same length.

In alternative embodiments, a longitudinal line comprises planar units of different lengths. The planar units positioned transversally at least partially next to each other at a certain cross-section over the width of the tape have for example a length 11 whereas the planar units at another cross-section over the width of the tape have a length 12, with 12 being different from 11.

The planar units are for example formed from batches of fibres, with a batch of fibres defined as the fibres that are applied in one step to form planar units positioned at least partially next to each other. Preferably, the planar units formed from one batch of fibres have the same length. The planar units formed from another batch can have the same or substantially the same length or can have a different length.

The transverse dimension w/n of a planar unit of a continuous fibrous tape according to the present invention ranges preferably between the average diameter of one individual fibre and the sum of the average diameter of 20 individual fibres. More preferably, the transverse dimension w/n of a planar unit of a continuous fibrous tape according to the present invention ranges between the average diameter of one individual fibre and the sum of the average diameter of 10 individual fibres. This means that very fine planar units are preferred, to minimise the number of cut fibres at each location and thus to maximise the strength of the tape, once consolidated into a composite.

The individual fibres in a planar unit are preferably aligned in a parallel or substantially parallel position to each other, whereby the individual fibres are preferably positioned next to each other. Preferably, the tips of the fibres in a planar unit are aligned, meaning that the tips of the fibres are located at the same or at substantially the same longitudinal position.

Preferably, the continuous fibrous tape according to the present invention has a limited thickness. It is clear that reducing the thickness of a tape will have an impact on the properties of the tape, in particular on the tensile strength of the consolidated composite produced from the continuous fibrous tape. However, by the particular arrangement of the longitudinal lines and of the planar units in the longitudinal lines according to the present invention, a high tensile strength of the tape, once consolidated into a composite, can be guaranteed even at low thickness of the tape. In preferred embodiments of the invention, the average thickness of the continuous fibrous tape ranges between the average diameter of the (natural) fibres and 5 times the average diameter of the (natural) fibres, in particular between the average diameter of the natural fibres and 5 times the average diameter of the natural fibres. The average thickness is for example equal to the diameter of the (natural) fibres, two times the diameter of the (natural) fibres or three times the diameter of the (natural) fibres.

The continuous fibrous tape preferably comprises a binding material, to keep the individual fibres and/or the planar units in position in the continuous fibrous tape. The binding material can also constitute of the matrix material which will be used in the ultimate composite binder. As binding material any material to keep the individual fibres and/or the planar units in position can be considered. Examples comprise paper, such as release paper, fibrous web, polymer material etc. A typical binding material will be added in typical quantities of maximum 5 weight %. The resulting tape will be referred to as preform tape or fibrous tape. In case only a carrier film like a release paper is used, the resulting tape will also be referred to as preform tape. In case the binding material constitutes a matrix material which will be used in the ultimate composite product and is added in approximately the quantity which is required for the composite product, the resulting tape will be referred to as prepreg tape.

In preferred embodiments the binding material comprises a polymer material such as a thermosetting polymer, a thermoplastic polymer or an elastomeric compound. In particular preferred embodiment the fibres of the tape are partially or fully impregnated with the polymer material.

The polymer material may be biodegradable or non-biodegradable.

The polymer material can be provided with one or more additives. Examples of additives comprise additives selected from the group consisting of anti-aging compounds, anti-flammable compounds, UV-resistance compounds and combinations thereof.

Examples of thermosetting or thermoplastic polymer material comprises material selected from the group consisting of epoxies, epoxies mixed with a hardener, vinyl esters, polyurethanes, polyester resins, furan resins, silicones, polyolefins, poly (vinyl chloride) (PVC), styrene polymers comprising polystyrene, styrene acrylonitrile, and acrylonitrile-butadiene-styrene, polyamides, polyacrylates, polycarbonates and combinations thereof.

The thermosetting, the thermoplastic or elastomeric material can be applied in its monomeric or oligomeric form, or directly in its polymer form.

A particular preferred polymer material comprises an epoxy or an epoxy mixed with a hardener.

The continuous fibrous tape according to the present invention preferably has a transverse dimension w ranging between 3 mm and 500 cm, more preferably between 5 mm and 50 cm or between 5 mm and 30 cm.

The continuous fibrous tape according to the present invention preferably has a length L ranging between 20 cm and 10 km, more preferably between 5 m and 2 km or between 20 m and 1 km.

In particular preferred embodiments the continuous fibrous tape is provided as a roll, for example a roll of a continuous fibrous tape whereby the fibres are partially or fully impregnated with a polymer material.

In a second aspect the present invention provides a method for manufacturing a continuous fibrous tape as described above. The continuous fibrous tape comprises a substantially planar sheet of natural fibres with a length Li. The continuous fibrous tape has a longitudinal dimension L and a transverse dimension w. The methods comprises the steps of:

providing n longitudinal lines, with n being an integer of at least 4, each longitudinal line comprising a plurality of substantially planar units, each planar unit comprising individual fibres having substantially the same length Li, each planar unit having a longitudinal dimension Li and a transverse dimension w/n, each planar unit having a first and a second transverse peripheral edge, opposite to each other and a first and a second longitudinal peripheral edge opposite to each other. The first and the second transverse peripheral edge have a dimension w/n and the first and the second longitudinal peripheral edge have a dimension Li. The planar units are positioned in a longitudinal line in such a way that the first transverse peripheral edge of a first planar unit is adjoining the second transverse peripheral edge of a second planar unit adjoining said first planar unit, where the term 'adjoining' is understood as lying next to or being in contact with a manufacturing tolerance of less than 2 mm in distance, positioning said n longitudinal lines of planar units transversally to each other in such a way that the transverse peripheral edges of planar units in a longitudinal line are misaligned in longitudinal direction with the transverse peripheral edges of planar units in an adjoining longitudinal line by a misalignment distance Lv, wherein the misalignment distance Lv is at least 3 w/n and in such a way that, if the misalignment distance Lv between the transverse peripheral edge of planar units in a first longitudinal line and the transverse peripheral edges of planar units in a second longitudinal line is less than 3 w/n, then there are at least two longitudinal lines positioned between the first longitudinal line and the second longitudinal line.

Preferably, the fibres in a planar unit are well aligned. With well aligned is meant that the fibres are oriented parallel or substantially parallel to each other, preferably next to each other, and that the fibre tips of the fibres of a planar unit correspond or substantially corresponds, i.e. are positioned at the same or substantially the same longitudinal position. Deviations between the fibre tips of the fibres of a planar unit are preferably lower than 2 mm, more preferably lower than 1 mm, or lower than 0.5 mm.

In case there is a gap between the fibres of adjoining planar units in a longitudinal line, i.e. between the first transverse peripheral edge of a first planar unit and the second transverse peripheral edge of a second planar unit adjoining the first planar unit in a longitudinal line, this gap is preferably smaller than 2 mm, for example smaller than 1 mm or smaller than 0.5 mm.

In preferred embodiments, a longitudinal line of planar units is obtained by introducing bundles of natural fibres in a channel of an alignment means. Preferably, the width of the channel determines the transverse width w/n of the planar unit. Preferably, fibres of planar units of different longitudinal lines are introduced in different channels of an alignment means. This is done by introducing a batch of fibres of length Li and width w into the alignment means. A batch of fibres is considered as the fibres that are introduced in one step, preferably simultaneously or substantially simultaneously in the channel or channels of the alignment means. A batch of fibres forms planar units that are transversally positioned (at least partially) next to each other. The alignment means imposes a fixed overlap pattern to the planar units of each batch.

In preferred embodiments the natural fibres are in a wet condition when being introduced in a channel or channels. Preferably, each bundle of fibres contains between 10 and 200% by weight of water based on the weight of the fibres.

The longitudinal tensile strength of a composite based on a tape according to the present invention can be increased by decreasing the transverse width w/n, i.e. by decreasing the number of individual fibres in a bundle/planar unit.

In preferred embodiments the method for manufacturing a continuous fibrous tape further comprises a step of applying a binding material on the fibres of the continuous fibrous tape. In particularly preferred embodiments, the method of manufacturing a continuous fibrous tape further comprises a step of applying a polymer material on the fibres of the continuous fibrous tape. The polymer material may comprise a thermosetting polymer, a thermoplastic polymer or an elastomeric polymer. The polymer material is preferably brought into contact with the fibres during a sufficient long period of time in order to allow absorption and/or adsorption of the polymer material to and around the fibres, thereby obtaining a prepreg or preform which is stabilized by the binding material, i.e. by the polymer material.

It can be preferred that the method further comprises a drying step, preferably before the application of the binding material, in particular before the application of the polymer material.

In a third aspect the use of continuous fibrous tapes as described above for manufacturing composite articles is provided.

The continuous fibrous tape, in particular when impregnated partially or fully with a polymer material, is suitable to be used in the composite industry. The continuous fibrous tape according to the present invention, in particular the continuous fibrous tape comprising bamboo fibres is suitable as reinforcement in high performance composites.

The continuous fibrous tape according to the present invention, impregnated or not impregnated, can provide an alternative to glass and carbon fibre tapes and prepregs with the advantage to have a considerable lower environmental impact.

As an example a composite windmill blade could be produced by winding a prepreg tape around a mandrel, after which the product is consolidated. Alternatively, a preform tape could be wound around a mandrel, after which resin infusion is used to impregnate the fibres and subsequently the final part is consolidated. A composite scooter could be produced by an automated fibre placement machine, which typically uses a narrow prepreg tape, which is placed onto a mould by the fibre placement robot, after which the composite part can be consolidated.

Particular and preferred aspects of the invention are set out in the accompanying independent and dependent claims. Features from the dependent claims may be combined with features of the independent claims and with features of other dependent claims as appropriate and not merely as explicitly set out in the claims.

BRIEF DESCRIPTION OF THE DRAWINGS

Further features of the present invention will become apparent from the examples and figures, wherein:

FIG. 9(a) and FIG. 9(b) illustrate tapes according to embodiments of the present invention, indicating that if the misalignment distance Lv between planar units of two longitudinal lines is less than 3 w/n, then at least two longitudinal lines are positioned between these longitudinal lines.

DETAILED DESCRIPTION OF PREFERRED EMBODIMENTS

Figure 1:
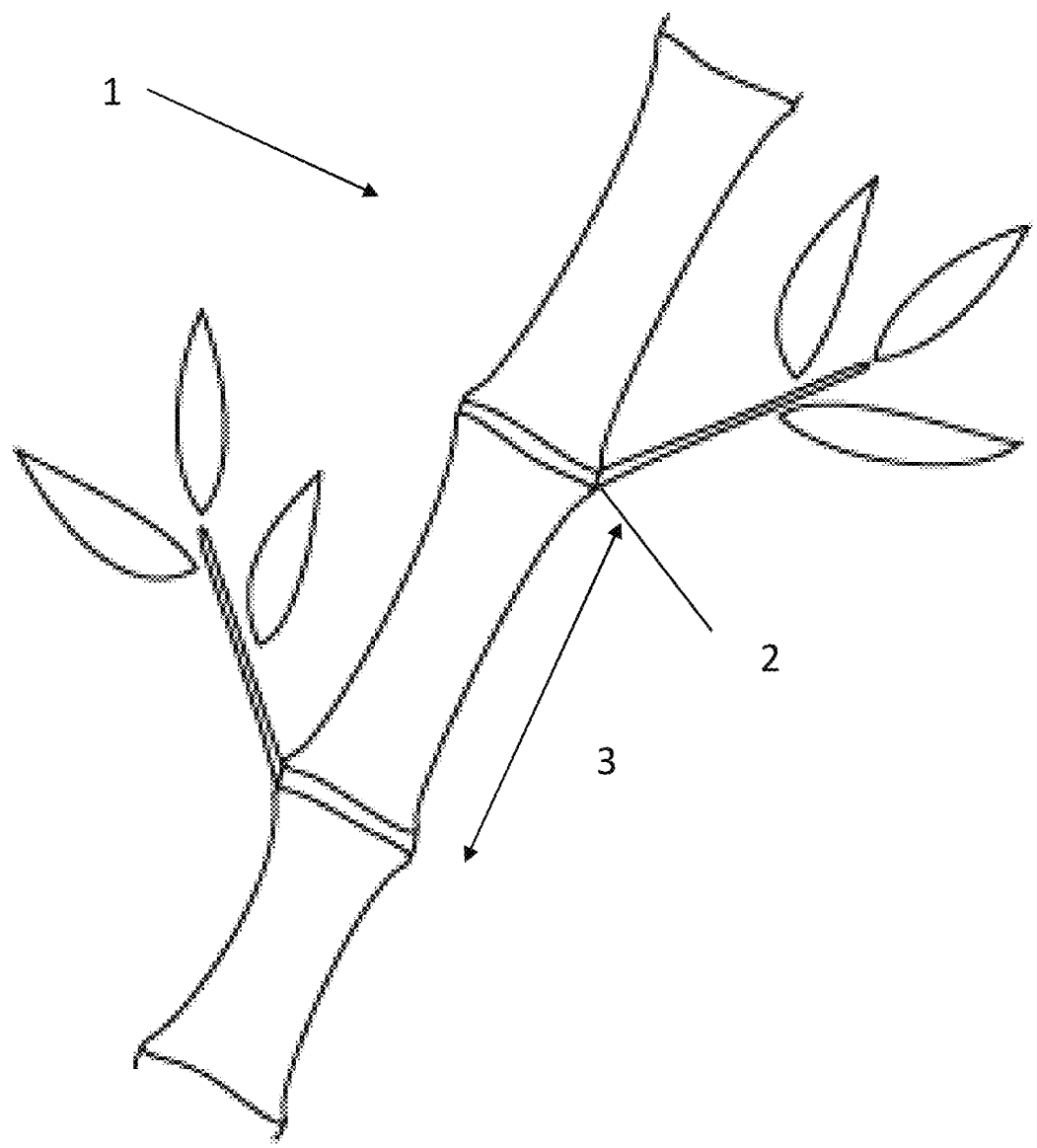
FIG. 1 schematically illustrates the nodal structure of bamboo.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated. The term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein. Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein. In the drawings, like reference numerals indicate like features; and, a reference numeral appearing in more than one figure refers to the same element. The drawings and the following detailed descriptions show specific embodiments of devices and methods for preparing a continuous tape, based on discontinuous fibres.

Wherein in embodiments described herein, reference is made to "continuous" reference may be made to an object having a length ranging from one or more meter to one or more kilometer. In other words an object such as a fibre, a tape or prepreg of for example 25 cm in length would in the context of this invention not be considered as "continuous" but as "discontinuous".

Wherein in embodiments described herein, reference is made to "pattern" reference may be made to an element which is repeated in a repeated way, preferably in a predictable way or predictable pattern. For example, in embodiments it is possible that the first and second fibre batch have a different length but the continuous tape comprises the same pattern, which is imposed on each batch.

Embodiments of the present invention preferably comprise bamboo fibres which are extracted from a bamboo culm. These bamboo culms may be extracted from a typical bamboo plantation, for example in Colombia or in Europe. A bamboo culm is schematically illustrated in FIG. 1. The culm 1 of a bamboo comprises nodes 2 and internodes 3. In the internodes 3 the fibres are well aligned, but in the nodes 2 there is a discontinuity of the fibres due to a large degree of entanglement. This nodal structure limits the maximum fibre length that can be extracted. The length of the fibres generally ranges between 15 and 50 cm. There are different methods to achieve extraction of natural fibres and in particular of bamboo fibres, like for example:

Extraction by steam explosion, where high pressure and temperature are used;

Chemical extraction that makes e.g. use of high concentrations of NaOH;

Mechanical extraction.

Mechanical extraction processes can take various forms, varying also in severity of mechanical impact on the fibres. Examples comprise decorticating machines or scotching and hackling machines. Decorticating machines are for example used for hemp fibres, yielding relatively short fibres with considerable fibre damage. Scutching and hackling machines are for example used for flax fibres, yielding much longer fibres with limited fibre damage. These processes are not suitable for bamboo fibres though, due to the high stiffness and strength of a bamboo culm and the relatively short internodal length.

When using mechanical extraction processes (like for instance that developed by the applicant) fibres with optimal properties are retrieved. The tensile strength of individual natural fibres, more particularly bamboo fibres, may reach 800 MPa (±15%) and the average modulus is 43 GPa (±2.5%). Other advantages of mechanical methods are that no chemicals are used and that no preparation of the raw material is needed. Furthermore the mechanical extraction processes comprise continuous processes that can be used at room temperature. The fibres used in embodiments of this present invention are extracted using this mechanical extraction process, however the invention is not limited to the latter.

After the extraction process the natural fibres may be cleaned. Bamboo fibres for example have a significant amount of parenchyma tissue on the fibre surface. This parenchyma tissue is preferably removed before using the fibres as reinforcement in composite materials. Not removed parenchyma tissue may create a weak interphase between the fibres and the impregnated polymer. To remove these impurities on the fibre surface, a cleaning process after extraction is preferred. After the removal of the impurities, the fibres will be ready for processing.

According to embodiments, cleaning of the fibres may be done automatically or on a manual basis. Automatic (i.e. mechanized) cleaning of the fibres is done by a machine. This machine may for example use brushes, to clean the fibres. Because of the limited fibre length the process is preferably not continuous. Preferably, the first side of the fibres is clamped and the other side is cleaned by the brushes and vice versa. The end result is preferably a flat, semi-aligned and clean fibre bundle. In manual cleaning the cleaning is done by hand by an operation resembling the operation of a mechanized industrial cleaning machine. Manual cleaning of the fibres as well as automatic cleaning may be done by different kinds of brushes. For example first a rough brush is used to align the fibres and to remove the biggest impurities. However, as after this operation a lot of particles may still be attached to the fibre, it may be preferred to use smaller brushes with softer hairs for further cleaning. In preferred embodiment all or substantially all dirt attached on or to the fibres is removed from the fibres in the cleaning operation, as dirt present on or to the fibres may result in a higher friction between the fibres which makes them difficult to manipulate.

Figure 2:
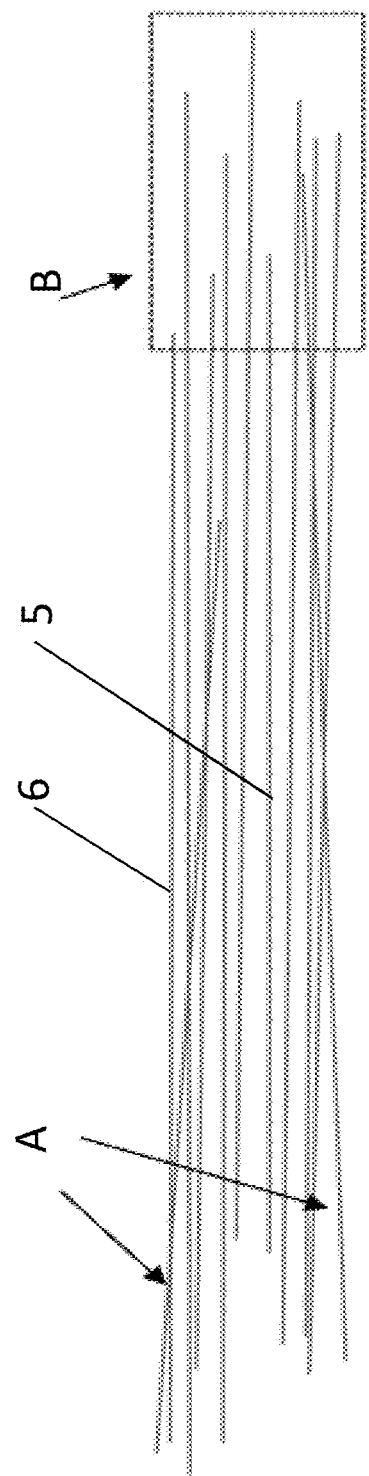
FIG. 2(a) and FIG. 2(b) schematically illustrate respectively in longitudinal view and in cross-sectional view some of the problems that may occur when natural fibres are processed.
Figure 2:
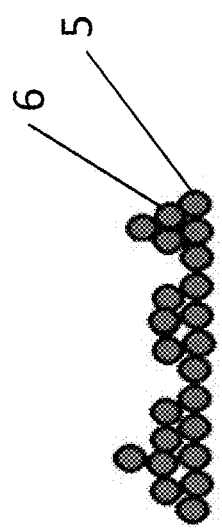

As indicated earlier the length of extracted natural fibres varies. For bamboo fibres for example the length varies for example between 15 and 50 cm. The thickness of extracted bamboo fibres varies for example between 90 and 250 µm. The bamboo fibres leave the cleaning process in relatively thin bundles. These bundles have semi-aligned fibres with shifted fibre tips in a random position. Also the thickness of the bundles may not be uniform but varying across the width. Some of the problems that may occur when processing natural fibres, in particular bamboo fibres, are shown in FIG. 2(a) and FIG. 2(b). FIG. 2(a) shows a bundle 5 of processed fibres 6 in longitudinal view and FIG. 2(b) shows the cross-section of a bundle 5 of processed fibres 6. Reference sign A indicates misaligned fibres 6, whereas reference sign B indicates shifted fibre ends. FIG. 2(b) illustrates that the thickness of a bundle 5 of processed fibres 6 may not be constant across the width w of the bundle 5. The fibres 6 may be in a saturated moisture condition (water). Water may be used for lubrication during the cleaning process.

To summarize, the main constraints when working with natural materials are the following: (1) Fibres do not have the same length, (2) the fibre end or tips are shifted, (3) the fibres are misaligned, (4) the obtained fibre bundles does not have a uniform thickness, (5) the friction between fibres is high and (6) the fibres are in a saturated moisture condition.

Figure 3:
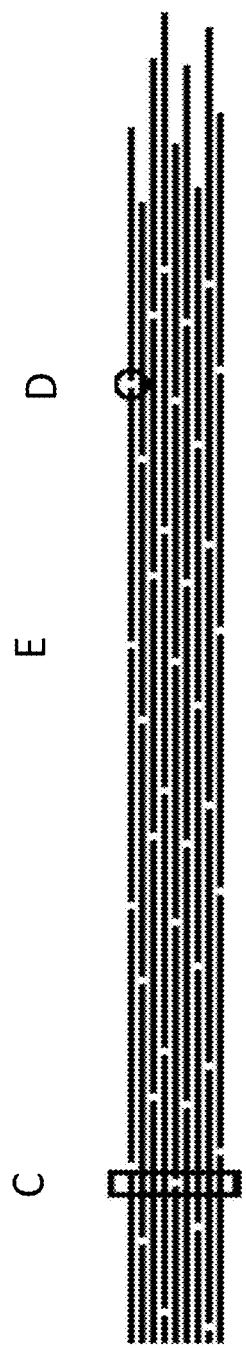
FIG. 3(a) and FIG. 3(b) schematically illustrate respectively a longitudinal view and a cross-sectional view of a tape comprising natural fibres according to the present invention.
Figure 3:

Embodiments of the present invention provide a method to manufacture continuous fibrous tapes comprising natural fibres in an optimized configuration. FIG. 3(a) and FIG. 3(b) schematically illustrate respectively a longitudinal view and a cross-sectional view of a tape comprising natural fibres according to the present invention. For optimal strength of a composite comprising such a tape, the fibres are preferably distributed across the tape as specified in claim 1. To avoid weak spots, two connected fibre or fibre bundle ends preferably may not lay next to or in the vicinity of two other connected fibre or fibre bundle ends. If fibre connection points in a transverse cross-section of the tape are located at almost the same lengthwise coordinate, there will be at least two fibres or fibre bundles positioned in between, which span the weak spots, as indicated by term C in FIG. 3(a). Ideally, there should be a limited gap or no gap between the fibre tips (indicated by term D in FIG. 3(a)) (preferably the gap is smaller than 2 mm) and no misalignment of fibres (indicated by term E in FIG. 3(a)). The ideal thickness of the tape should be uniform. A thin tape is targeted, preferably with a thickness of a few (natural) fibres. The thickness of the tape is preferably constant over de width of the tape as shown in FIG. 3(b).

Figure 4:
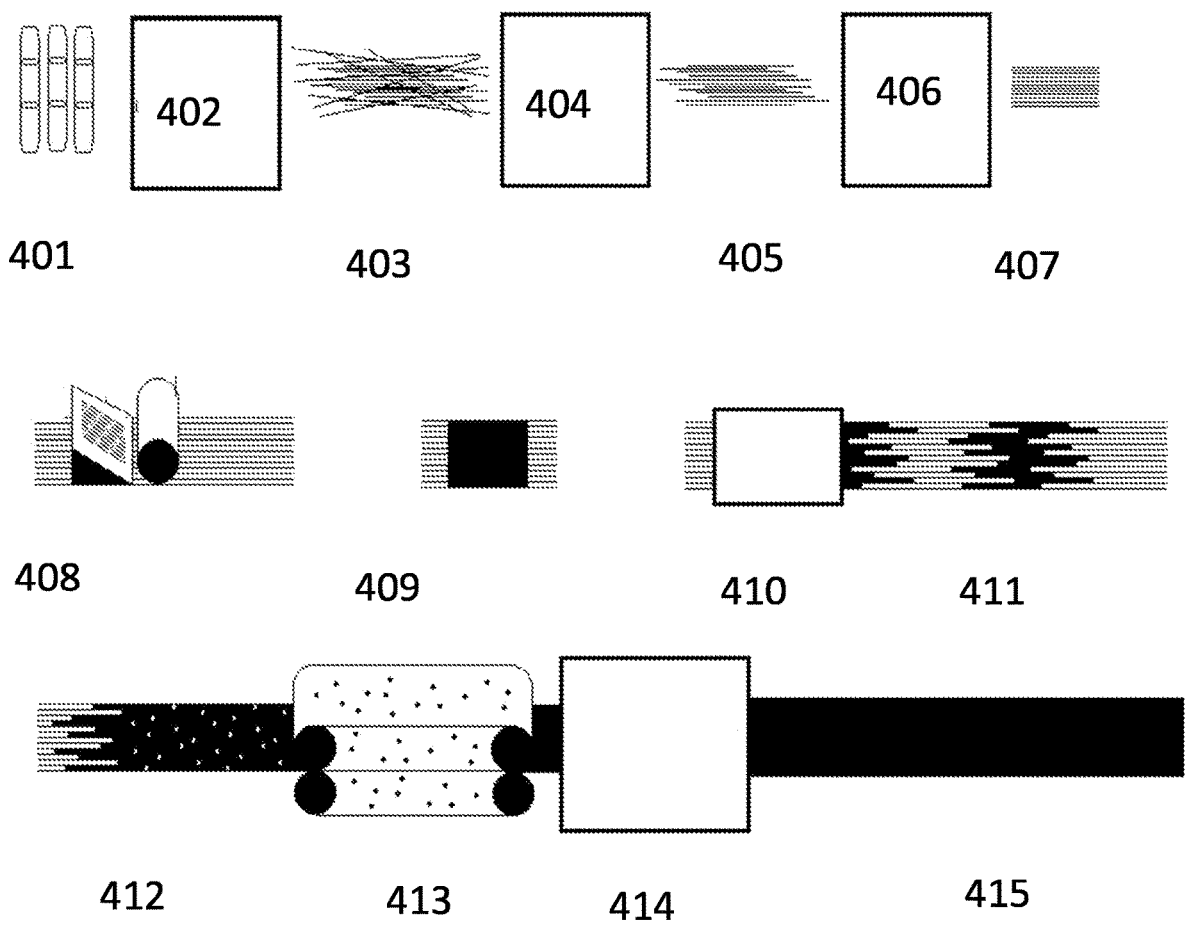
FIG. 4 schematically illustrates the steps of a method according to embodiments of the present invention, from raw material to continuous natural fibre prepreg.
Figure 5:
FIG. 5(a) illustrates fibres provided in a mold, as for example when using a hand lay-up method for obtaining a composite comprising a tape obtained by embodiments of the present invention.
FIG. 5(b) illustrates the light RTM method with vacuum.
Figure 5:
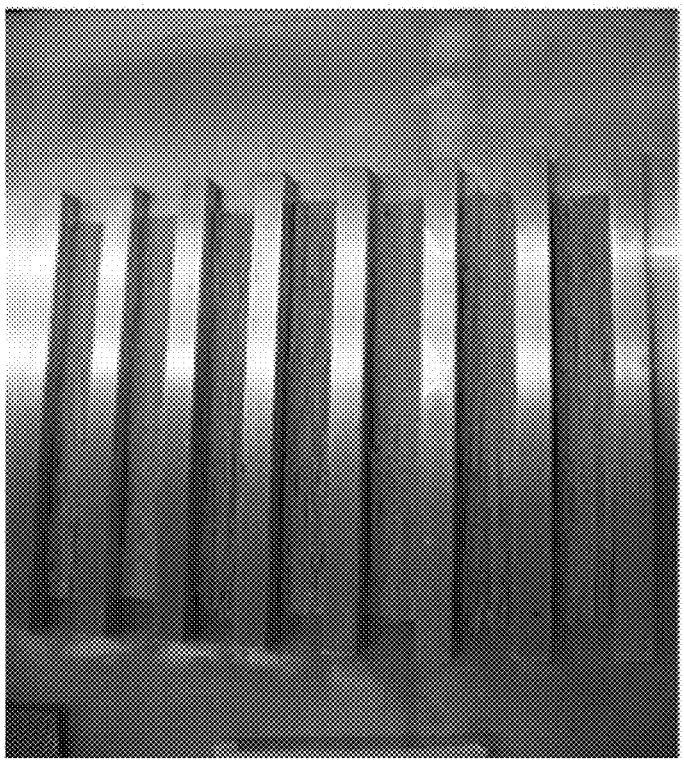

FIG. 4 illustrates the steps of a method according to the present invention. Raw bamboo 401 is introduced in a fibre extraction machine 402, for example in a mechanical fibre extraction machine. The obtained extracted bamboo fibres 403 are at least partially misaligned as illustrated in FIG. 2(a) and FIG. 2(b). The fibres 403 are then cleaned for example in a cleaning machine 404 to obtain cleaned semi-aligned bamboo fibres 405. Subsequently, the cleaned semialigned bamboo fibres 405 are cut for example in a cutting machine 406 to obtain bamboo fibres 407 with a fixed length, for example a length between 10 and 20 cm. After the cutting process, the fibres are introduced into channels as indicated by 408 to obtain bamboo fibres in channels indicated by 409. In preferred embodiments the channels have a rectangular cross-section or a V-shaped cross-section. When all the fibres are provided in the channels they are preferably shifted and distributed in an optimized pattern 411 by a device 410. Every batch or bundle of shifted fibres matches the previous batch to make a continuous tape 412. All of the previous steps preferably take place in wet conditions, this requires a drying operation for a further prepregging or preform consolidation process. To do this the fibres are dried for example on a perforated conveyor belt 413 that keeps them in place, and for example also during the subsequent process to attach the polymer or binder by device 414 (prepregging or binder application) to provide a continuous bamboo fibre preform or prepreg 415.

The length of the fibres after extraction and cleaning may vary. For example for bamboo fibres the length may vary between 15 and 50 cm. Therefore when such fibres would be further processed into a tape keeping their original length, this could easily lead to gaps and thus to weak spots. The advantage of cutting the fibres at a certain length is that it makes it possible to have control over the shifting pattern. An optimized shifting pattern can be applied to the fibres to rule out weak spots and therefore to increase the strength. The disadvantage of cutting is the created waste of material, but this waste can further be used in short fibre mats or for injection moulding compounds. The above considerations may lead to the choice of making the prepreg with bundles of fibres, for bamboo fibres these may have a length of 10 cm. If the shortest fibres that come out of the extraction and cleaning process are considered (for bamboo for example this is 15 cm) then a cutting zone which is appropriate for the fibre length (e.g. of 2.5 cm for bamboo) is taken on each side, leaving bundles of 10 cm length in the example of bamboo fibre.

Due to the high friction between the natural fibres, e.g. bamboo fibres, it is almost impossible to shift one fibre without shifting the whole package of fibres. This is a disadvantage, but this can be transformed into an advantage by bringing the fibres into channels. If the fibres are placed into channels it is easy to move a small bamboo fibre bundle within a channel without moving the fibres in the neighboring channels. Channel widths preferably are between 0.2 and 5 mm, and more preferably between 1 mm and 2 mm in width.

Embodiments of the present invention provide a prepreg or tape wherein natural fibres are distributed, preferably long discontinuous bamboo fibres as illustrated in FIG. 8(a), FIG. 8(b), FIG. 9(a) and FIG. 9(b). For optimal strength of the composite, the ends of the fibres or transverse peripheral edges of planar units are preferably distributed across the tape or prepreg. In addition, to avoid weak spots, two connected fibre ends or edges of planar units preferably may not lay next to or in the vicinity of two other connected fibre ends or edges of planar units. If planar units of different longitudinal lines in a cross-section of the tape are located at almost the same lengthwise coordinate, there will be at least two longitudinal lines positioned in between, which span the weak spots, as illustrated schematically in FIG. 9(a) and FIG. 9(b). More particularly, if the misalignment distance Lv between the transverse peripheral edge of planar units in first longitudinal line 10 and the transverse peripheral edges of planar units in a second longitudinal line 13 is less than 3 w/n, then there are at least two longitudinal lines, i.e. longitudinal line 11 and longitudinal line 12 positioned between the first longitudinal line 10 and the second longitudinal line 13.

Ideally, there should be no gap between the fibre tips or fibre ends and no misalignment of fibres in a planar unit. As a criterion, the gap between the fibres between adjoining planar units in a longitudinal line should be less than 2 mm, as well as the possible gap between the planar units in transverse direction. These gaps will form resin pockets in the composite which will be detrimental for composite strength. The ideal thickness of the tape should be uniform. A tape with a thickness of maximum five times the diameter of the fibres is preferred. A tape with a thickness of one fibre diameter of the fibres, in particular one fibre diameter of the bamboo fibres is the most preferred.

The length of the natural fibres used in a prepreg or tape according to embodiments of the invention may vary, for example for bamboo fibres the length varies between 15 and 50 cm, therefore when the fibres would be further processed into a tape keeping their original length, this could easily lead to gaps and thus to weak spots. As a result the natural fibres used in a tape or prepreg according to the present invention are preferably cut at well-defined lengths, e.g. between 10 and 30 cm. The advantage of cutting the fibres at well-defined lengths is that it makes it possible to have control over the shifting pattern. An optimized shifting pattern can be applied to the fibres to rule out weak spots and therefore to increase the strength. The disadvantage of cutting is the created waste of material, but this waste can further be used in short fibre mats. This may lead to the choice of making the prepreg with bundles of fibres, for bamboo fibres these may have a length of 10 cm. If the shortest fibres that come out of the extraction and cleaning process are taken (for bamboo for example this is 15 cm) then a cutting zone which is appropriate for the fibre length (e.g. of 2.5 cm for bamboo) is taken on each side, leaving bundles of 10 cm length. In preferred embodiments the fibres of all the bundles have the same length, however the present invention is not limited thereto. Consecutive bundles, wherein the fibres of each bundle have the same length, can have a different length, as long as the pattern applied to each bundle is the same, so that they preferably exactly fit in sequence with each other.

When a tape or prepreg comprising a pattern according to embodiments of the present invention is obtained, the latter is used as a reinforcing element in a composite. Composites are a result of a combination of two or more phases. The reinforcing phase, in this case the natural fibres e.g. bamboo fibres, provides strength and stiffness and is embedded in the matrix phase, in this case epoxy was used. The epoxy was added afterwards to a preformed bamboo tape according to this invention with two methods. Alternatively, also a prepreg route could have been used.

To let the epoxy cure a catalyst, e.g. 1,2-diaminocyclohexane, is used. The mass proportion catalyst/epoxy is in this case 15,2/100. The epoxy mixture is blended to reach a uniform distribution. Afterwards the epoxy mixture is placed into a vacuum chamber to eliminate air bubbles. Dried patterned unidirectional bamboo fibres, formed following the procedure of the concept, are placed into the mold cavities to create the samples. The dimensions of the samples are 25×210 mm. Different methods known in the art may be used to make the composites, we will provide two different methods (a hand lay up (HLU) and light resin transfer molding (Light RTM)) which may be used to make the composites.

In a first method the epoxy mixture is poured on the bamboo fibres in the mold manually. Then the mold is closed and put into a hot press which can apply a desired heat and pressure. The pressure is kept constant at 10 bar which was the lowest pressure on the available machine, a lower pressure is preferred. The temperature needed for the curing process is given by the manufacturer of the epoxy resin, in this case one hour at 75° C. followed by one hour at 150° C. After this process the composite samples can be taken out of the mold. This is a relatively quick method to make composite samples but because of the manual pouring of the epoxy mixture some porosity can be present in the composite.

Figure 8:
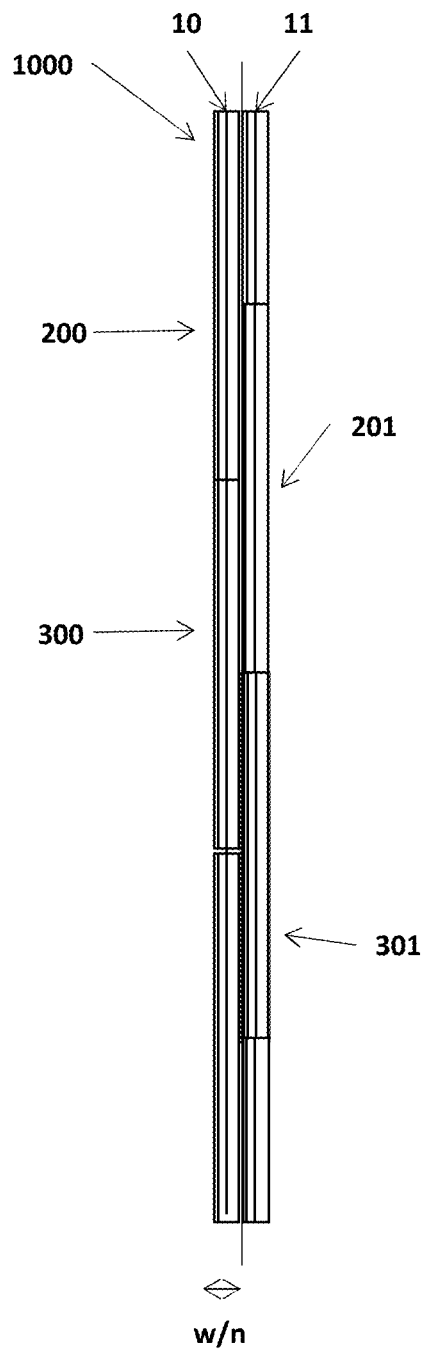
FIG. 8(a) and FIG. 8(b) schematically illustrate a tape according to embodiments of the present invention, wherein the misalignment distance of planar units of two adjacent longitudinal lines is larger than 3 w/n.
Figure 8:
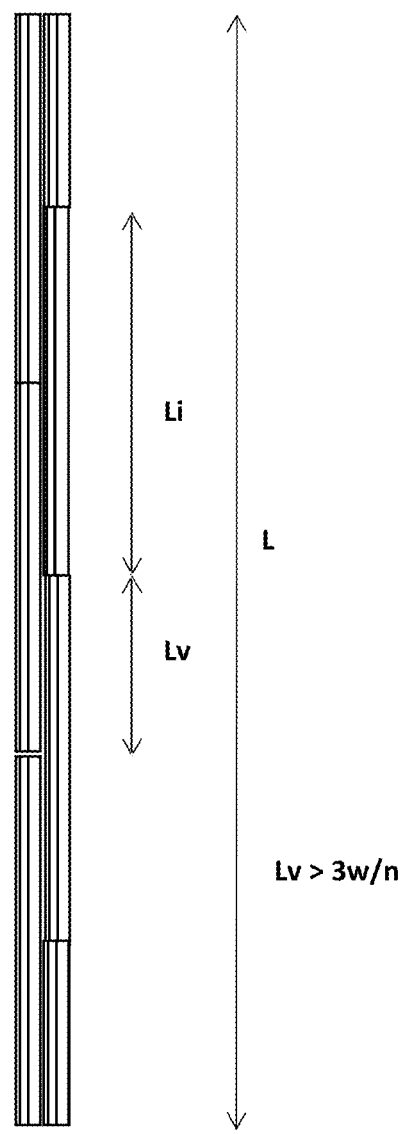

A second method has been used which is called light resin transfer molding because it uses a vacuum to apply the pressure instead of a press. The mold is hermetically closed by a plastic foil and sealing tape. First of all the mold is pulled vacuum to see if there are no air gaps. Then the epoxy mixture is guided into the mold by a tube and a porous material (breather). By observation is determined when every mold cavity is filled with resin so the curing process can start. This curing process is in this case one hour at 75° C. followed by one hour at 150° C. After this process the composite samples can be taken out of the mold. Seven samples with an average volume fraction of 28% were created with this technique. FIG. 8(a) shows the mold where the patterned fibres are placed in and FIG. 8(b) illustrates how the light RTM method with the vacuum is done.

Testing of Samples Obtained using Methods According to the Present Invention

Tensile test samples were prepared according to ASTM D3039. Measurements were carried out using an Instron 4467 Tensile Tester with a load cell of 30 kN. The crosshead speed was 2 mm/min. The samples were mechanically clamped. Sand paper was inserted between the clamps and the samples to prevent slippage. The gauge length was set at 150 mm. An extensometer with a gauge length of 50 mm was used to accurately measure displacement data. Data were gathered at a sampling rate of 10 points/second. In total eleven samples were tested: four samples produced by the hand lay-up method with 2 mm channel width, five samples by the light-RTM method with 2 mm channel width and two samples by the light-RTM method with 1 mm channel width. The results of the tests are given in Table 1. Testing the first four samples gave an average tensile modulus of 18 (±3) GPa, which is similar to the stiffness of unidirectional composite samples without any cuts. Due to technical problems, it was not possible to obtain the displacement of the samples for the second bundle or batch of composites LRTM_DUD2 and LRTM_DUD1 and therefore it was not possible to calculate their stiffness. Nevertheless, the value can be expected to be close to 18 GPa.

Figure 6:
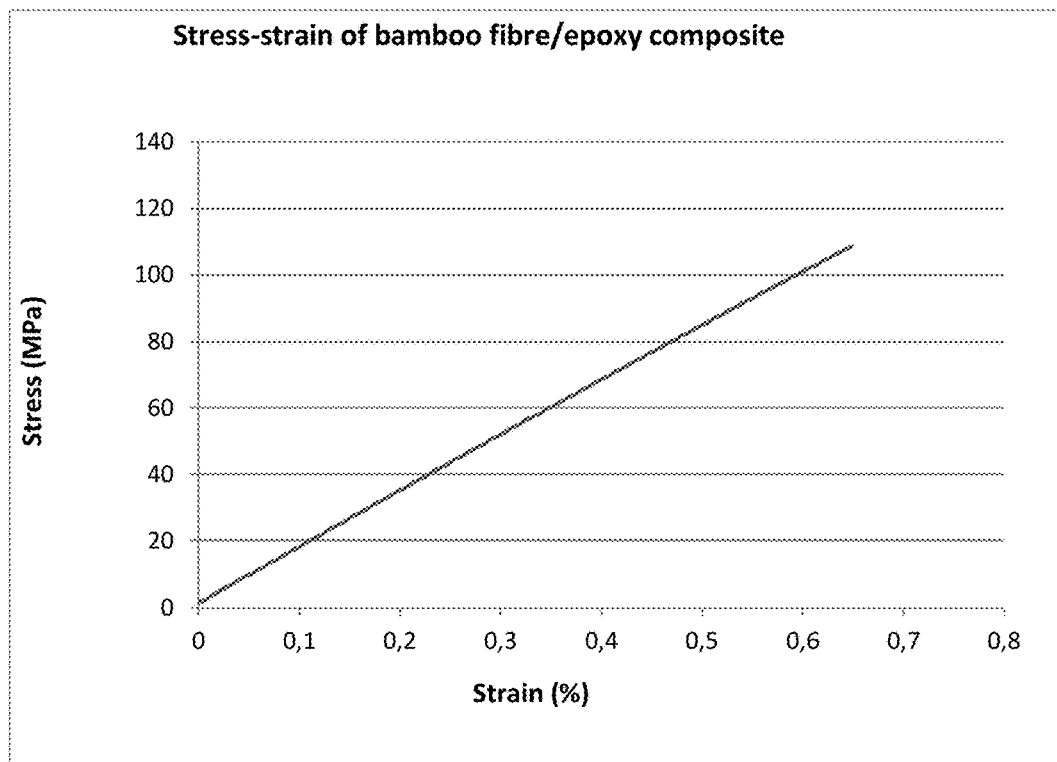
FIG. 6 illustrates a typical stress strain curve of a bamboo fibre/epoxy composite known in the art.
Figure 7:
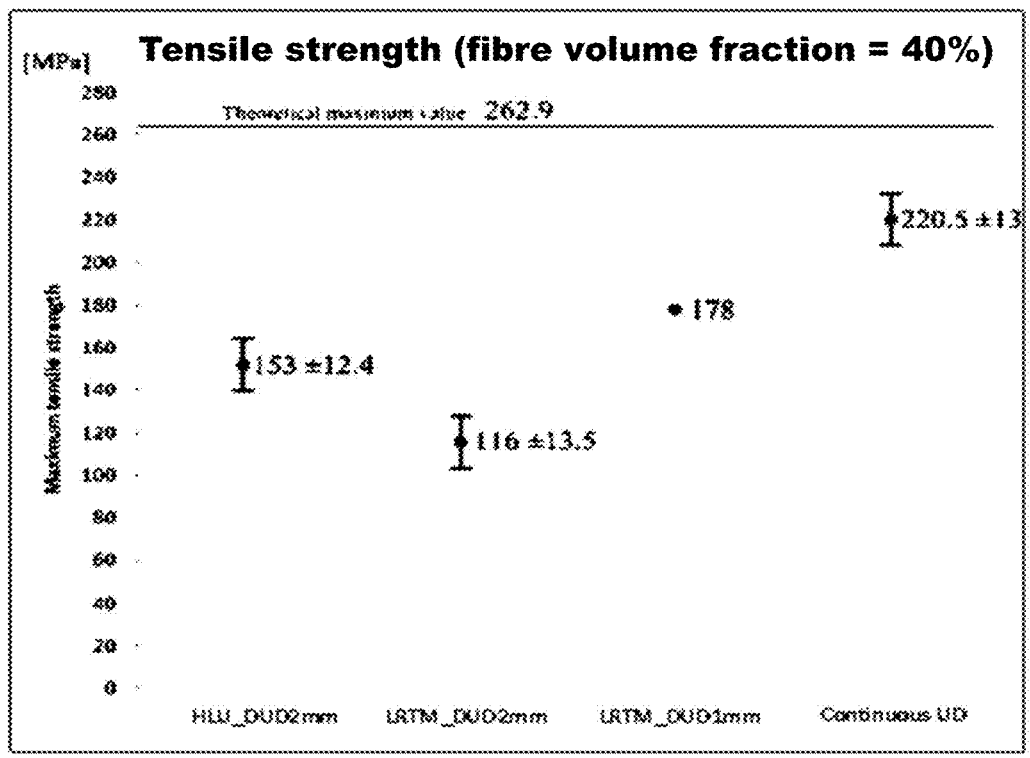
FIG. 7 illustrates the tensile strength of composites based on tape obtained by using methods of the present invention.

The results as illustrated in FIG. 7 show that the width of the channels has a great influence on the final strength of the composite. Light-RTM with 2 mm and 1 mm channel width delivered an average tensile strength of 116 MPa and approximately 178 MPa, respectively. This is logical because a bundle twice as wide, will have about double the amount of weak connection points (cuts) at the same lengthwise coordinate position. A possible explanation for the lower strength values for light RTM with 2 mm channels as compared to the HLU samples, can be found in the relative thickness compared to the hand lay-up process, leading to resin rich samples with the brittle epoxy resin. For the sake of comparison a typical stress strain curve of a bamboo fibre/epoxy composite is shown in FIG. 6.

Embodiments of the present invention provide a method and more specifically a mechanical operation to distribute long discontinuous natural fibres, which may be fixed in length like e.g. bamboo fibres, into an endless tape configuration of aligned fibres. This 'tape' may advantageously be used as a preform or prepreg in the composite industry, enabling the use of natural fibres in composites on a large and industrial scale. To optimize the strength of the resulting composite, the ends of the fibres or fibre bundles are preferably distributed across the preform. The fibres used for the experiments are preferably cleaned bamboo fibres that are cut to a length of for example 10 cm. To ease the movement of the fibres, a package or batch of bamboo fibres is introduced into channels. Subsequently, the batch of fibres is shifted in the channels following an optimized shifting pattern. The optimization of the shifting pattern tries to maximize the fracture length and takes into account the weak spots between adjacent fibres or fibre bundles. The influence of the width of the channels is investigated using tensile strength tests. Samples were created with channels of 2 mm width and channels of 1 mm width. Samples created by channels of 1 mm width had a tensile strength of 178 MPa normalized at a fibre volume fraction of 40%. This is only 20% lower than the tensile strength of continuous bamboo fibre/epoxy composites. Embodiments of the present invention advantageously show the potential of bamboo fibres as reinforcements in high performance composites.

It is to be understood that this invention is not limited to the particular features of the means and/or the process steps of the methods described as such means and methods may vary. It is also to be understood that the terminology used

TABLE 1

Mechanical properties of the samples

| Sample # | Length of the fibre [mm] | Width of the channel* [mm] | Thickness of the tape [mm] | Width of the tape [mm] | Gaugelength [mm] | $\sigma_{max}$** |
|---|---|---|---|---|---|---|
| HLU_DUD2_0 | 100 | 2 | 1.28 | 21.64 | 150 | 151.6 |
| HLU_DUD2_1 | 100 | 2 | 1.19 | 24.14 | 150 | 165.8 |
| HLU_DUD2_2 | 100 | 2 | 1.12 | 23.24 | 150 | 136.2 |
| HLU_DUD2_3 | 100 | 2 | 1.28 | 22.20 | 150 | 156.6 |
| LRTM_DUD2_0 | 100 | 2 | 1.72 | 24.85 | 150 | 101.6 |
| LRTM_DUD2_1 | 100 | 2 | 1.59 | 24.80 | 150 | 122.4 |
| LRTM_DUD2_2 | 100 | 2 | 1.44 | 25.20 | 150 | 135.4 |
| LRTM_DUD2_3 | 100 | 2 | 1.61 | 25.38 | 150 | 105.9 |
| LRTM_DUD2_4 | 100 | 2 | 1.61 | 25.39 | 150 | 114.3 |
| LRTM_DUD1_0 | 100 | 1 | 1.18 | 25.19 | 150 | 178.0 |
| LRTM_DUD1_1 | 100 | 1 | 1.22 | 25.37 | 150 | 115.5*** |

With
*the width of the channel determining the final width of the planar units of a longitudinal line
**The maximal tensile strength at breaking point normalized at a fibre volume fraction of 40%,
***the σmax of LRTM_DUD1_1 will be neglected due to damage (cracks) of the sample before testing.

herein is for purposes of describing particular embodiments only, and is not intended to be limiting. It must be noted that, as used in the specification and the appended claims, the singular forms "a" "an" and "the" include singular and/or plural referents unless the context clearly dictates otherwise. It is also to be understood that plural forms include singular and/or plural referents unless the context clearly dictates otherwise. It is moreover to be understood that, in case parameter ranges are given which are delimited by numeric values, the ranges are deemed to include these limitation values.

REFERENCE SIGNS OF FIG. 8(a), FIG. 8(b), FIG. 9(a) and FIG. 9(b)

[1000] tape
[10, 11, 12, 13] longitudinal lines
[200, 201, 300, 301] substantially planar units consisting of one or more fibres (fibre bundle)
[w] width of tape
[L] length of the tape
[w/n] width of planar unit or bundle
[Li] length of unit and fibres
[$L_v$] difference or overlap or misalignment in lengthwise coordinate between adjoining units, each unit comprised in a different longitudinal line; more specifically $L_v$ is the overlap length between units in two different longitudinal lines

The invention claimed is:

1. A continuous fibrous tape, comprising a substantially planar sheet of natural fibres of length Li, said sheet having a longitudinal dimension L, a transverse dimension w; said sheet comprising substantially planar units positioned in n longitudinal lines, with n being an integer of at least 4, said longitudinal lines being positioned next to each other, each planar unit comprising individual natural fibres having substantially the same length Li; each planar unit having a longitudinal dimension Li and a transverse dimension w/n, each planar unit having a first and a second transverse peripheral edge, opposite to each other and a first and a second longitudinal peripheral edge, opposite to each other; said first and said second transverse peripheral edge having a dimension w/n and said first and said second longitudinal peripheral edge having a dimension Li, each longitudinal line comprising a plurality of planar units positioned in such a way that the first transverse peripheral edge of a first planar unit is adjoining the second transverse peripheral edge of a second planar unit adjoining said first planar unit, wherein the transverse peripheral edges of planar units in a longitudinal line are misaligned in longitudinal direction with the transverse peripheral edges of planar units in an adjoining longitudinal line by a misalignment distance Lv, wherein the misalignment distance Lv is at least 3 w/n;

and wherein, if the misalignment distance Lv between the transverse peripheral edge of planar units in a first longitudinal line and the transverse peripheral edges of planar units in a second longitudinal line is less than 3 w/n, then there are at least two longitudinal lines positioned between the first longitudinal line and the second longitudinal line.

2. The continuous fibrous tape according to claim 1, wherein said fibres comprise bamboo fibres.

3. The continuous fibrous tape according claim 1, wherein the planar units of different longitudinal lines have substantially the same length.

4. The continuous fibrous tape according claim 1, wherein the planar units are formed from batches of fibres, with a batch of fibres defined as the fibres that are applied in one step to form planar units positioned at least partially next to each other and wherein fibres from different batches have a different length.

5. The continuous fibrous tape according to claim 1, wherein the transverse dimension w/n ranges between the average diameter of one individual fibre and the sum of the average diameter of 20 individual natural fibres.

6. The continuous fibrous tape according to claim 1, wherein a planar unit comprises a bundle of maximal 20 individual fibres of length Li.

7. The continuous fibrous tape according to claim 1, wherein the individual fibres in a planar unit are aligned in a parallel or substantially parallel position to each other, whereby the individual fibres are positioned next to each other.

8. The continuous fibrous tape according to claim 1, wherein said fibres have a diameter ranging between 5 μm and 4 mm.

9. The continuous fibrous tape according to claim 1, wherein the fibre length Li of the individual fibres in a planar unit is at least 50 mm.

10. The continuous fibrous tape according to claim 1, wherein said continuous fibrous tape has an average thickness ranging between the average diameter of said fibres and 5 times the average diameter of said fibres.

11. The continuous fibrous tape according to claim 1, further comprising additional fibres, said additional fibres being selected from the group consisting of aramid, ceramic, metal, glass, polyethylene, polyester, carbon and/or combinations thereof.

12. The continuous fibrous tape according to claim 1, further comprising a binding material.

13. The continuous fibrous tape according to claim 12, wherein said binding material comprises a polymer material, said polymer material comprising a thermosetting material, a thermoplastic polymer or an elastomeric compound, wherein the fibres are at least partially impregnated by said polymer material, resulting in a preform or prepreg.

14. A method for manufacturing a continuous fibrous tape as defined in claim 1, said continuous fibrous tape comprising a substantially planar sheet of natural fibres of length Li, said continuous fibrous tape having a longitudinal dimension L and a transverse dimension w, said method comprising the steps of:

providing n longitudinal lines, with n being an integer of at least 4, each longitudinal line comprising a plurality of substantially planar units, each planar unit comprising individual fibres having substantially the same length Li; each planar unit having a longitudinal dimension Li and a transverse dimension w/n, each planar unit having a first and a second transverse peripheral edge, opposite to each other and a first and a second longitudinal peripheral edge, opposite to each other; said first and said second transverse peripheral edge having a dimension w/n and said first and said second longitudinal peripheral edge having a dimension Li, said planar units are positioned in a longitudinal line in such a way that the first transverse peripheral edge of a first planar unit is adjoining the second transverse peripheral edge of a second planar unit adjoining said first planar unit, positioning said n longitudinal lines of planar units transversally next to each other in such a way that the transverse peripheral edges of planar units in a longitudinal line are misaligned in longitudinal direction with the transverse peripheral edges of planar units in an adjoining longitudinal line by a misalignment distance Lv, wherein the misalignment distance Lv is at least 3 w/n and in such a way that, if the misalignment distance Lv between the transverse peripheral edge of planar units in a first longitudinal line and the transverse peripheral edges of planar units in a second longitudinal line is less than 3 w/n, then there are at least two longitudinal lines positioned between the first longitudinal line and the second longitudinal line.

15. The method for manufacturing a continuous fibrous tape according to claim 14, wherein the gap between the fibres of adjoining planar units in a longitudinal line is less than 2 mm.

16. The method for manufacturing a continuous fibrous tape according to claim 14, wherein a longitudinal line of planar units is obtained by introducing a bundle of natural fibres in a channel of an alignment means.

17. The method for manufacturing a continuous fibrous tape according to claim 14, further comprising the step of applying a binding material.

18. The method to manufacture a continuous fibrous tape according to claim 17, further comprising a drying step before the application of the binding material.

* * * * *